United States Patent
Chen

(10) Patent No.: US 10,838,560 B2
(45) Date of Patent: Nov. 17, 2020

(54) METHOD OF MANUFACTURING TOUCH ELECTRODE LAYER AND TOUCH ELECTRODE LAYER

(71) Applicant: WUHAN CHINA STAR OPTOELECTRONICS SEMICONDUCTOR DISPLAY TECHNOLOGY CO., LTD., Hubei (CN)

(72) Inventor: Xia Chen, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 146 days.

(21) Appl. No.: 16/087,650

(22) PCT Filed: Aug. 2, 2018

(86) PCT No.: PCT/CN2018/098335
§ 371 (c)(1),
(2) Date: Sep. 23, 2018

(87) PCT Pub. No.: WO2020/000578
PCT Pub. Date: Jan. 2, 2020

(65) Prior Publication Data
US 2019/0391685 A1 Dec. 26, 2019

(30) Foreign Application Priority Data
Jun. 25, 2018 (CN) .......................... 2018 1 0685240

(51) Int. Cl.
*G06F 3/044* (2006.01)
*C09J 11/06* (2006.01)
(Continued)

(52) U.S. Cl.
CPC ................ *G06F 3/044* (2013.01); *C09J 4/00* (2013.01); *C09J 9/02* (2013.01); *C09J 11/06* (2013.01); *G06F 2203/04103* (2013.01)

(58) Field of Classification Search
CPC ....... C08K 5/34; C09J 11/06; C09J 2205/102; C09J 2400/163; C09J 4/00; C09J 7/30;
(Continued)

(56) References Cited

U.S. PATENT DOCUMENTS

2006/0135709 A1* 6/2006 Hasegawa .............. C08K 5/053
525/474
2011/0212661 A1 9/2011 Lee
2015/0376477 A1 12/2015 Katami et al.

FOREIGN PATENT DOCUMENTS

CN 104995276 A 10/2015
CN 105776902 A 7/2016
(Continued)

*Primary Examiner* — Sophie Hon
(74) *Attorney, Agent, or Firm* — Mark M. Friedman

(57) ABSTRACT

A method of manufacturing a touch electrode layer includes coating a cured layer solution on a surface of a conductive network component of a substrate, curing the cured layer solution to obtain a cured layer, and removing a substrate body to form the touch electrode layer. The cured layer solution includes a photocurable adhesive and an azole compound. A touch electrode layer including a conductive network component and a cured layer is also provided.

8 Claims, 3 Drawing Sheets

(51) Int. Cl.
*C09J 9/02* (2006.01)
*C09J 4/00* (2006.01)

(58) Field of Classification Search
CPC .... C09J 9/02; G06F 2203/04103; G06F 3/044
See application file for complete search history.

(56) References Cited

FOREIGN PATENT DOCUMENTS

| | | | |
|---|---|---|---|
| CN | 105786242 A | * | 7/2016 |
| CN | 105786242 A | | 7/2016 |
| CN | 106293259 A | | 1/2017 |
| CN | 107099256 A | | 8/2017 |

* cited by examiner

METHOD OF MANUFACTURING TOUCH ELECTRODE LAYER AND TOUCH ELECTRODE LAYER

FIELD OF INVENTION

The present disclosure relates to the field of display device manufacturing, and more particularly to a method of manufacturing a touch electrode layer and a touch electrode layer.

BACKGROUND OF INVENTION

Nowadays, silver nanowires have good characteristics in terms of electrical, optical, and mechanical properties. In recent years, silver nanowires as an alternative material for indium tin oxide (ITO) have attracted widespread attentions from researchers. Touch electrode layers manufactured using silver nanowires have advantages such as high transparency, low surface resistance, smooth surface, good flexibility, and low price. When the touch electrode layers manufactured in existing technologies are under moisture, high temperature, and applied direct current voltage, the silver nanowires are prone to oxidation and migration, thereby causing failure of the manufactured touch electrode layers.

Therefore, it is necessary to provide a new method of manufacturing a touch electrode layer and a touch electrode layer to solve the above technical problems that the silver nanowires are prone to oxidation and migration, thereby causing failure of the manufactured touch electrode layers.

SUMMARY OF INVENTION

An object of the present disclosure is to provide a new method of manufacturing a touch electrode layer and a touch electrode layer to solve the above technical problems that the silver nanowires are under moisture, high temperature, and applied direct current voltage, such that the silver nanowires are prone to oxidation and migration, structures of the silver nanowires are unstable, thereby causing failure of the manufactured touch electrode layers.

To achieve the above object, an embodiment of the present disclosure provides a method of manufacturing a touch electrode layer including: a step S10 of providing a substrate, wherein the substrate includes a substrate body and a conductive network component formed on a surface of the substrate body; a step S20 of coating a cured layer solution on a surface of the conductive network component, such that the cured layer solution covers at least a portion of the conductive network component, wherein the cured layer solution includes a photocurable adhesive and an azole compound; a step S30 of curing the cured layer solution to obtain a cured layer; and a step S40 of removing the substrate body to form the touch electrode layer.

In an embodiment of the present disclosure, a mass percentage of the azole compound in the cured layer solution ranges between 0.1% and 10%.

In an embodiment of the present disclosure, the azole compound includes one or more selected from the group consisting of benzotriazole, mercaptobenzimidazole, 2-mercaptobenzoxazole, 1-phenyl-5-mercaptotetrazole, 2-mercaptobenzothiazole, 2-mercaptobenzimidazole, and lauryl imidazoline.

In an embodiment of the present disclosure, the step S10 further includes: a step S101 of providing the substrate body and coating a silver nanowire dispersion liquid on the surface of the substrate body; a step S102 of drying a solvent in the silver nanowire dispersion liquid to form a silver nanowire conductive network component; a step S103 of providing a silver paste on a surface of the silver nanowire conductive network component and drying the silver paste to form a silver conductive layer; and a step S104 of performing a patterning process on a combination of the silver conductive layer and the silver nanowire conductive network component to form the conductive network component on the surface of the substrate body.

In an embodiment of the present disclosure, the step S30 includes: irradiating the cured layer solution with ultraviolet light to cure the cured layer solution to form the cured layer.

An embodiment of the present disclosure further provides a touch electrode layer including a conductive network component and a cured layer. The conductive network component includes a silver nanowire conductive network component and a silver conductive layer. The silver conductive layer is disposed on a surface of the silver nanowire conductive network component. The cured layer covers at least a portion of the conductive network component.

In an embodiment of the present disclosure, the silver nanowire conductive network component is formed by drying a silver nanowire dispersion liquid, and the silver conductive layer is formed by coating a silver paste on the silver nanowire conductive network component and drying the silver paste.

In an embodiment of the present disclosure, the cured layer is formed by irradiating a cured layer solution including a photocurable adhesive and an azole compound with ultraviolet light to cure the cured layer solution to form the cured layer.

In an embodiment of the present disclosure, the azole compound includes one or more selected from the group consisting of benzotriazole, mercaptobenzimidazole, 2-mercaptobenzoxazole, 1-phenyl-5-mercaptotetrazole, 2-mercaptobenzothiazole, 2-mercaptobenzimidazole, and lauryl imidazoline.

In an embodiment of the present disclosure, a mass percentage of the azole compound in the cured layer solution ranges between 0.1% and 10%.

The embodiments of the present disclosure have advantages that the method of manufacturing the touch electrode layer and the touch electrode layer provided by embodiments of the present disclosure forms a thin and dense two-ligand protective film or a fully ligand protective film on the surface of the touch electrode layer by adding the azole compound to the cured layer solution, thereby reducing erosion of moisture and corrosive gases on the touch electrode layer, prolonging a service life of the touch electrode layer, and further improving a stability of the touch electrode layer.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

Figure 1:
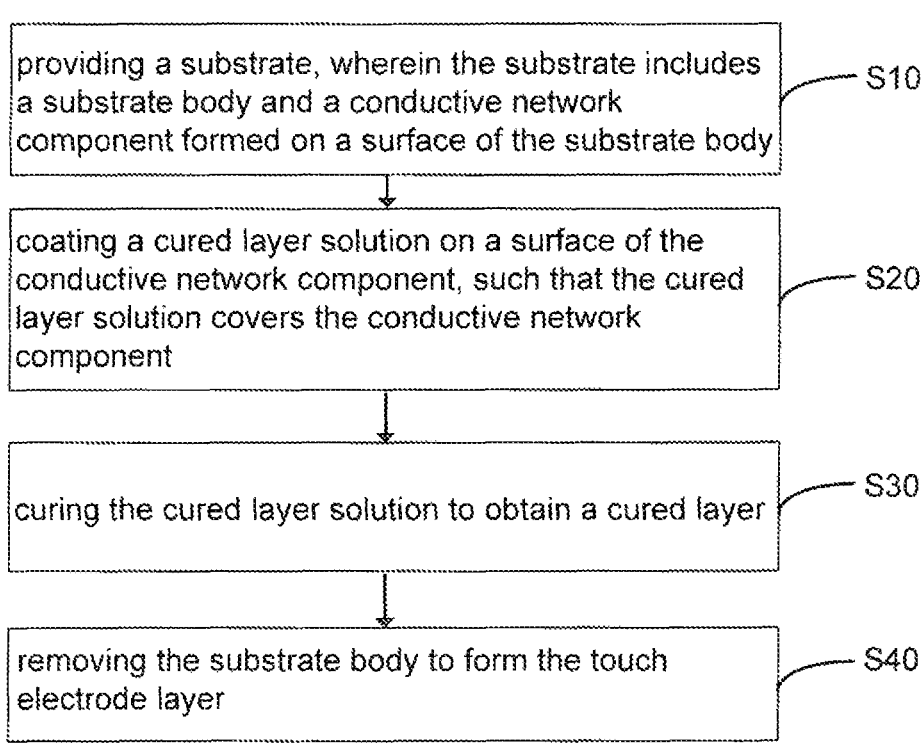
FIG. 1 is a flow chart of a method of manufacturing a touch electrode layer according to an embodiment of the present disclosure.

FIG, 1A is a schematic diagram illustrating the method of manufacturing the touch electrode layer of FIG. 1.

Figure 1A:
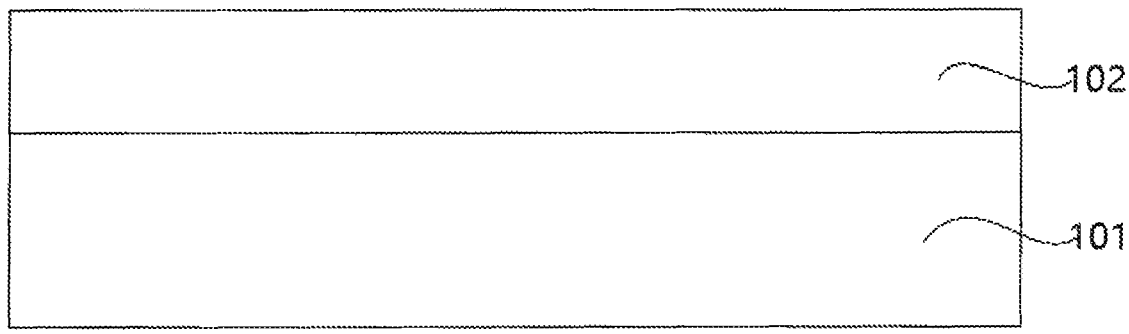
Figure 1B:
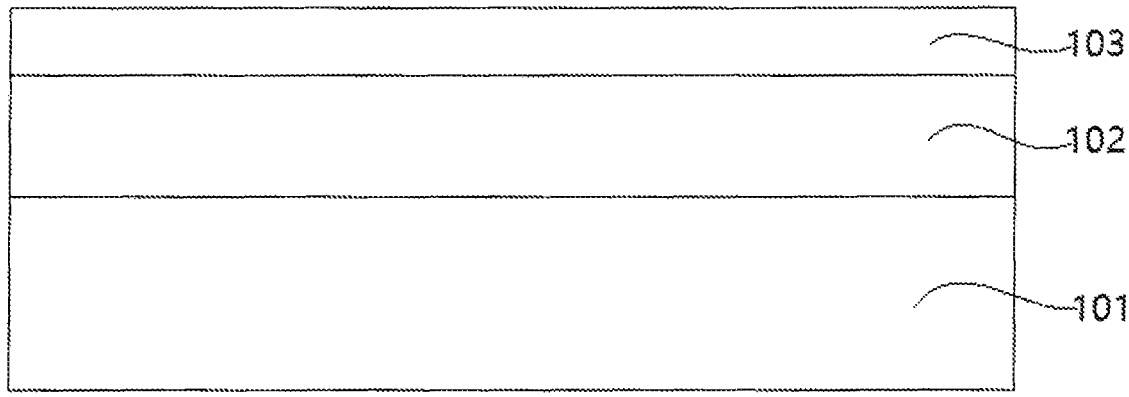

FIG. 1B is a schematic diagram illustrating the method of manufacturing the touch electrode layer of FIG. 1.

Figure 1C:
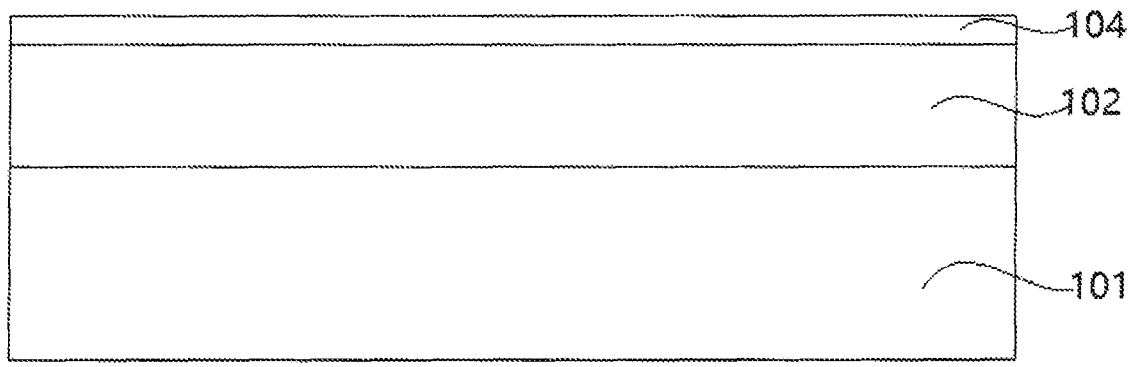

FIG. 1C is a schematic diagram illustrating the method of manufacturing the touch electrode layer of FIG. 1.

Figure 1D:
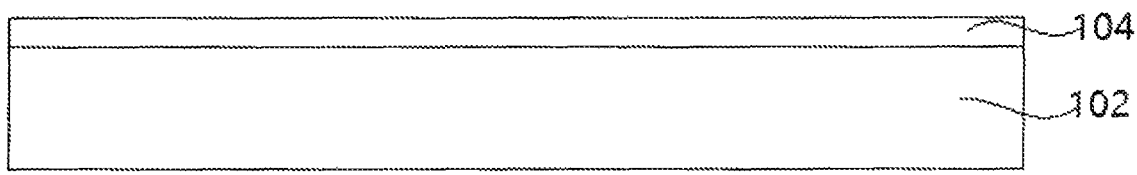

FIG. 1D is a schematic diagram illustrating the method of manufacturing the touch electrode layer of FIG. 1.

Figure 2:
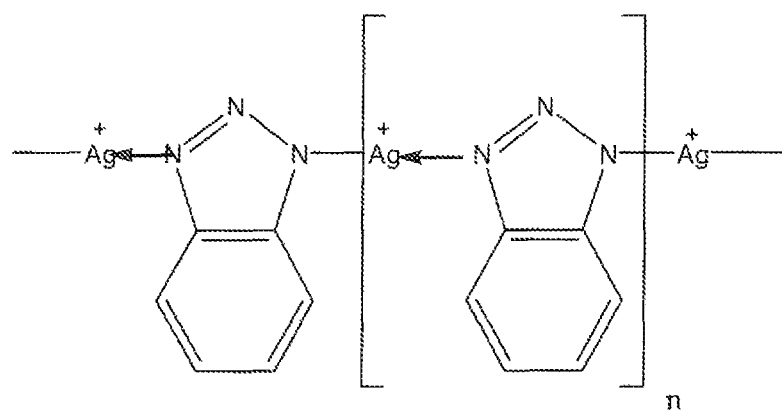

FIG. 2 is a schematic diagram illustrating a chemical structure of a complex film formed by benzotriazole (BTA) and a silver wire.

Figure 3:
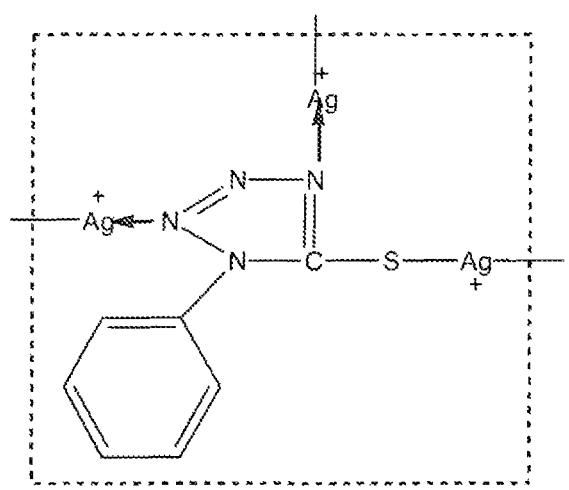

FIG. 3 is a schematic diagram illustrating a chemical structure of a complex film formed by 1-phenyl-5-mercaptotetrazole (PMTA) and a silver wire.

Figure 4:
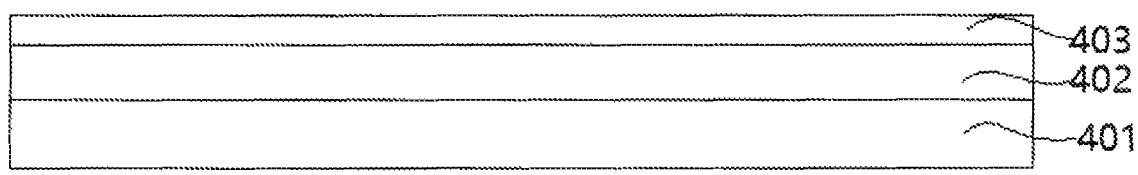

FIG. 4 is a schematic structural diagram of a touch electrode layer according to an embodiment of the present disclosure.

DETAILED DESCRIPTION OF PREFERRED EMBODIMENTS

The embodiments described herein with reference to the accompanying drawings are explanatory, illustrative, and used to generally understand the present disclosure. Furthermore, directional terms described by the present disclosure, such as top, bottom, front, rear, left, right, inner, outer, side, etc., are only directions by referring to the accompanying drawings, and thus the used terms are used only for the purpose of describing embodiments of the present disclosure and are not intended to be limiting of the present disclosure. In the drawings, modules with similar structures are labeled with the same reference number.

The present disclosure provides a new method of manufacturing a touch electrode layer to effectively solve technical problems for manufacturing touch electrode layers in existing technologies that the touch electrode layers are under moisture, high temperature, and applied direct current voltage, such that silver nanowires are prone to oxidation and migration, thereby causing failure of the manufactured touch electrode layers.

Refer to FIG. 1, a flow chart of a method of manufacturing a touch electrode layer according to an embodiment of the present disclosure is provided. The method includes the following steps:

A step S10 of providing a substrate, wherein the substrate includes a substrate body 101 and a conductive network component 102 formed on a surface of the substrate body.

A step S20 of coating a cured layer solution on a surface of the conductive network component 102, such that the cured layer solution 103 covers at least a portion of the conductive network component 102, wherein the cured layer solution 103 includes a photocurable adhesive and an azole compound.

A step S30 of curing the cured layer solution 103 to obtain a cured layer 104.

A step S40 of removing the substrate body 101 to form the touch electrode layer.

The steps of the method are described in detail below with reference to FIG. 1A to FIG. 1D.

In the step S10, the substrate is provided. The substrate includes a substrate body 101 and a conductive network component 102 disposed on a surface of the substrate body 101. The step S10 further includes the following steps:

A step S101 of providing the substrate body 101 and coating a silver nanowire dispersion liquid on the surface of the substrate body 101.

A step S102 of drying a solvent in the silver nanowire dispersion liquid to form a silver nanowire conductive network component.

A step S103 of providing a silver paste on a surface of the silver nanowire conductive network component and drying the silver paste to form a silver conductive layer.

A step S104 of performing a patterning process on a combination of the silver conductive layer and the silver nanowire conductive network component to form the conductive network component 102 on the surface of the substrate body 101.

In the step S101, the substrate body 101 is first subjected to surface hydrophilic treatment for one hour. The surface hydrophilic treatment is to increase a hydroxyl group to react with a silane coupling agent, such that adhesion of the substrate body 101 is increased. The silane coupling agent is formulated into a 0.2% alcohol solution. The alcohol solution is added with acetic acid such that pH of alcohol solution is 5. The substrate body 101 subjected to the surface hydrophilic treatment is immersed in silane-coupled alcohol solution for three minutes, is taken out from the silane-coupled alcohol solution, then is washed and immersed in ethanol for two times, and then is dried at 80° C., so as to enhance the adhesion of the substrate body 101. A silver nanowire dispersion liquid is applied onto the surface of the hydrophilized substrate body 101.

In an embodiment of the present disclosure, the silver nanowires in the silver nanowire dispersion liquid have a mass percentage ranges between 0.1% and 1%. The silver nanowire dispersion liquid further includes a solvent or a mixed solvent of one or more of deionized water, isopropanol, ethanol, butanol. The silver nanowire dispersion liquid further includes surfactant and dispersion stabilizer.

in the step S102, solvent in the silver nanowire dispersion liquid is dried at 120° C. to form the silver nanowire conductive network component. The silver nanowire conductive network component is made by a liquid phase reduction method from the silver nanowire dispersion liquid.

The silver nanowires of the silver nanowire conductive network component overlap with each other to form a uniform three-dimensional silver nanowire structure. Silver nanowires network is a three-dimensional network formed by uniformly arranging and overlapping silver nanowires having a diameter of 50 nm to 400 nm and an aspect ratio of 100 to 400. A thickness of the silver conductive layer ranges between 50 nm and 400 nm. High aspect ratio of the silver nanowire can effectively reduce haze of the silver nanowire.

In the step S103, silver paste is disposed on the surface of the, silver nanowire conductive network component, and the silver paste is dried to form the silver conductive layer. The silver conductive layer is formed by drying at 140° C. to 150° C.

In the step S104, a patterning process is performed on a combination of the silver conductive layer and the silver nanowire conductive network component, such that the conductive network component 102 is formed on the surface of the substrate body 101. The patterning process is laser etching, as illustrated in FIG. 1A, and the process proceeds to the step S20.

In the step S20, a cured layer solution 103 is coated on the surface of the conductive network component 102, such that the cured layer solution 103 covers at least a portion of the conductive network component 102. The cured layer solution 103 includes a photocurable adhesive and an azole compound.

The photocurable adhesive consists of a mass percentage of components: a photoinitiator, an acrylate prepolymer, and remaining of a triazine ring-containing polyfunctional acrylate and a dipentaerythritol polyfunctional acrylate.

A mass percentage of the azole compound in the cured layer solution ranges between 0.1% and 10%. The detail process includes adding 0.5% of the azole compound to the photocurable adhesive, coating the cured layer solution 103 on the substrate 101 engraved with silver wire and silver paste touch pattern after dissolving process, the azole compound in the cured layer solution 103 is complexed with silver ions in the silver paste layer to form a thin and dense two-ligand protective film or a fully ligand protective film on the surface of the silver wire. Reaction conditions of chemical reaction are standing at room temperature or heating. The cured layer solution 103 may infiltrate into the silver nanowires, and the silver wire and silver paste pattern is embedded.

In an embodiment of the present disclosure, the azole compound includes one or more selected from the group consisting of benzotriazole (BTA), mercaptobenzimidazole, 2-mercaptobenzoxazole (MBO), 1-phenyl-5-mercaptotetrazole (PITA), 2-mercaptobenzothiazole (MBT), 2-mercaptobenzimidazole (MBI), and lauryl imidazoline. Reaction of the azole compound with the silver wire can be carried out under conditions such as standing or heating. The azole compound may be 0.5% benzotriazole (BTA), which forms a linear complex with silver ions as illustrated in FIG. 2. The azole compound may also be 0.5% 1-phenyl-5-mercaptotetrazole (PMTA), which forms a surface complex with silver ions as illustrated in FIG. 3.

The reason of this method capable of improving stability of the silver nanowires is same as the principle of that the azole compound can be used as a silver corrosion inhibitor or a discoloration preventive agent. After the treatment, the azole compound is complexed with the silver nanowires and forms a thin and dense two ligand protective film or a fully ligand protective film on the silver surface. When the azole compound reacts with the surface of the silver wire, on one hand, a polar group centered on an atom with a large electronegativity, such as N, a and S is adsorbed on the silver surface, thereby changing a structure of an electric double layer and increasing activation energy during metal ionization process on another hand, a non-polar group (such as phenyl) composed of C or H atom is away from the silver surface and arranged in a direction to form a hydrophobic film, which becomes a barrier for diffusion of a corrosive medium, and a corrosion process is inhibited. Another possible reason is that the dense protective film formed by the azole compound and silver ions covers the surface of the silver nanowires, reduces an amount of air moisture reaching the surface of the silver wire, inhibits silver migration, and improves stability of the silver nanowires. As illustrated in FIG. 18, the process proceeds to the step S30.

In the step S30, the cured layer solution 103 is cured to obtain a cured layer 104. The step S30 includes: irradiating the cured layer solution 103 with ultraviolet light to cure the cured layer solution 103 to form the cured layer 104. As illustrated in FIG. 1C, the process proceeds to the step S40.

In the step S40, the substrate body 101 is removed to form the touch electrode layer, as illustrated in FIG. 1D.

Refer to FIG. 4, an embodiment of the present disclosure further provides a touch electrode layer including a conductive network component and a cured layer 403. The conductive network component includes a silver nanowire conductive network component 401 and a silver conductive layer 402. The silver conductive layer 402 is disposed on a surface of the silver nanowire conductive network component 401. The cured layer 403 covers at least a portion of the conductive network component.

In an embodiment of the present disclosure, the silver nanowire conductive network component 401 is formed by drying a silver nanowire dispersion liquid, and the silver conductive layer 402 is formed by coating a silver paste on the silver nanowire conductive network component 401 and drying the silver paste.

In an embodiment of the present disclosure, the cured layer 403 is formed by irradiating a cured layer solution including a photocurable adhesive and an azole compound with ultraviolet light to cure the cured layer solution to form the cured layer.

In an embodiment of the present disclosure, the azole compound includes one or more selected from the group consisting of benzotriazole, mercaptobenzimidazole, 2-mercaptobenzoxazole. 1-phenyl-5-mercaptotetrazole, 2-mercaptobenzothiazole, 2-mercaptobenzimidazole, and lauryl imidazoline.

In an embodiment of the present disclosure, a mass percentage of the azole compound in the cured layer solution ranges between 0.1% and 10%.

The manufactured touch electrode layer is subjected to functional test and environmental test.

The embodiments of the present disclosure have advantages that the method of manufacturing the touch electrode layer and the touch electrode layer provided by embodiments of the present disclosure adds the azole compound to the cured layer solution, such that the surface of the touch electrode layer forms a thin and dense two-ligand protective film or a fully ligand protective film, thereby reducing erosion of moisture and corrosive gases on the touch electrode layer, prolonging a service life of the touch electrode layer, and further improving a stability of the touch electrode layer.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

The invention claimed is:

1. A method of manufacturing a touch electrode layer, comprising:
    a step S10 of providing a substrate, wherein the substrate comprises a substrate body and a conductive network component formed on a surface of the substrate body;
    wherein the step S10 further comprises:
    a step S101 comprising coating a silver nanowire dispersion liquid on the surface of the substrate body;
    a step S102 of drying a solvent in the silver nano wire dispersion liquid to form a silver nanowire conductive network component;
    a step S103 comprising providing a silver paste layer on a surface of the silver nanowire conductive network component, and forming the conductive network component;
    a step S20 of coating a cured layer solution on the silver paste layer forming a surface of the conductive network component, such that the cured layer solution covers at least a portion of the conductive network component, wherein the cured layer solution comprises a photocurable adhesive and an azole compound that is complexed with silver ions in the silver paste layer;
    a step S30 of curing the cured layer solution to obtain a cured layer; and a step S40 of removing the substrate body to form the touch electrode layer;

wherein the azole compound is complexed with the silver ions in the silver paste layer, to form a linear complex with the silver ions, or a surface complex with the silver ions, which forms a surface of the touch electrode layer as a thin and dense, two-ligand protective film or a fully ligand protective film, thereby reducing erosion of the touch electrode layer by moisture and corrosive gases.

2. The method of manufacturing the touch electrode layer according to claim 1, wherein a mass percentage of the azole compound in the cured layer solution ranges between 0.1% and 10%.

3. The method of manufacturing the touch electrode layer according to claim 2, wherein the azole compound comprises one or more selected from the group consisting of benzotriazole, mercaptobenzimidazole, 2-mercaptobenzoxazole, 1-phenyl-5-mercaptotetrazole, 2-mercaptobenzothiazole, 2-mercaptobenzimidazole, and lauryl imidazoline.

4. The method of manufacturing the touch electrode layer according to claim 1, wherein the step S10 further comprises:

drying the silver paste to form a silver conductive layer in the step 103; and a step S104 of performing a patterning process on a combination of the silver conductive layer and the silver nanowire conductive network component to form the conductive network component on the surface of the substrate body.

5. The method of manufacturing the touch electrode layer according to claim 1, wherein the step S30 comprises: irradiating the cured layer solution with ultraviolet light to cure the cured layer solution to form the cured layer.

6. A touch electrode layer, comprising:

a conductive network component comprising a silver nanowire conductive network component and a silver conductive layer, wherein the silver conductive layer is disposed on a surface of the silver nanowire conductive network component; and a cured layer which covers at least a portion of the conductive network component;

wherein the silver nanowire conductive network component is formed by drying a silver nanowire dispersion liquid, and the silver conductive layer is formed by coating a silver paste layer on the silver nanowire conductive network component and drying the silver paste layer;

wherein the cured layer is formed by coating a cured layer solution comprising a photocurable adhesive and an azole compound, on the silver paste layer, and irradiating with ultraviolet light to cure the cured layer solution to form the cured layer; and wherein the azole compound is added to the cured layer solution, and is complexed with silver ions in the silver paste layer, to form a linear complex with the silver ions, or a surface complex with the silver ions, which forms a surface of the touch electrode layer as a thin and dense, two-ligand protective film or a fully ligand protective film, thereby reducing erosion of the touch electrode layer by moisture and corrosive gases.

7. The touch electrode layer according to claim 6, wherein the azole compound comprises one or more selected from the group consisting of benzotriazole, mercaptobenzimidazole, 2-mercaptobenzoxazole, 1-phenyl-5-mercaptotetrazole, 2-mercaptobenzothiazole, 2-mercaptobenzimidazole, and lauryl imidazoline.

8. The touch electrode layer according to claim 6, wherein a mass percentage of the azole compound in the cured layer solution ranges between 0.1% and 10%.

* * * * *

UNITED STATES PATENT AND TRADEMARK OFFICE
CERTIFICATE OF CORRECTION

| | | |
|---|---|---|
| PATENT NO. | : 10,838,560 B2 | Page 1 of 1 |
| APPLICATION NO. | : 16/087650 | |
| DATED | : November 17, 2020 | |
| INVENTOR(S) | : Xia Chen | |

It is certified that error appears in the above-identified patent and that said Letters Patent is hereby corrected as shown below:

On the Title Page

Column 1, item (30) should be added as follows:
Foreign Application Priority Data
June 28, 2018 (CN)......................... 201810685240.8

Signed and Sealed this
Thirtieth Day of August, 2022

Katherine Kelly Vidal
*Director of the United States Patent and Trademark Office*